United States Patent
Hotta et al.

(10) Patent No.: US 12,018,954 B2
(45) Date of Patent: Jun. 25, 2024

(54) ROUTE SEARCH DEVICE AND ROUTE SEARCH METHOD FOR RIDE-SHARING VEHICLE

(71) Applicant: TOYOTA JIDOSHA KABUSHIKI KAISHA, Toyota (JP)

(72) Inventors: Daichi Hotta, Tokyo (JP); Sadayuki Abe, Shizuoka-ken (JP); Nobukazu Ueki, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 17/696,248

(22) Filed: Mar. 16, 2022

(65) Prior Publication Data
US 2022/0316894 A1  Oct. 6, 2022

(30) Foreign Application Priority Data
Mar. 30, 2021  (JP) .................................. 2021-058124

(51) Int. Cl.
*G01C 21/34* (2006.01)
*G06V 20/59* (2022.01)

(52) U.S. Cl.
CPC ......... *G01C 21/3461* (2013.01); *G06V 20/59* (2022.01)

(58) Field of Classification Search
CPC .............................. G01C 21/3461; G06V 20/59
See application file for complete search history.

(56) References Cited

U.S. PATENT DOCUMENTS

| 2001/0047241 | A1* | 11/2001 | Khavakh | G01C 21/3415 |
| | | | | 701/410 |
| 2004/0039524 | A1* | 2/2004 | Adachi | G01C 21/30 |
| | | | | 701/410 |
| 2017/0103649 | A1* | 4/2017 | Belzner | G08G 1/0129 |
| 2020/0333789 | A1* | 10/2020 | Suzuki | G05D 1/0297 |

FOREIGN PATENT DOCUMENTS

| JP | 2018-144544 A | 9/2018 |
| JP | 2019-020127 A | 2/2019 |

* cited by examiner

*Primary Examiner* — Seth A Silverman
(74) *Attorney, Agent, or Firm* — Dinsmore & Shohl LLP

(57) ABSTRACT

A route search device includes a memory and a processor. The processor performs search processing for a route from a current position to a destination of a ride-sharing vehicle based on data stored in the memory. A standard route with the shortest requested time from the current position to the destination is calculated in the search processing. A high-frequency route with a frequency of encountering a pedestrian between the current position and the destination that is higher than the standard route is also calculated in the search processing. A recognition level is compared with a reference level in the search processing. When the recognition level is equal to or less than the reference level, the standard route is selected as a final route. When the recognition level is higher than the reference level, the high-frequency route is selected as the final route.

8 Claims, 12 Drawing Sheets

ROUTE SEARCH DEVICE AND ROUTE SEARCH METHOD FOR RIDE-SHARING VEHICLE

CROSS-REFERENCE TO RELATED APPLICATION

This application claims priority to Japanese Patent Application No. 2021-058124 filed on Mar. 30, 2021, incorporated herein by reference in its entirety.

BACKGROUND

1. Technical Field

The present disclosure relates to a device and a method that search for a route from a current position of a vehicle to a destination.

2. Description of Related Art

Japanese Unexamined Patent Application Publication No. 2019-020127 (JP 2019-020127 A) discloses a device configured to search for a route from a current position of a vehicle to a destination. This device in the related art includes a plurality of sensors that recognizes an external situation of the vehicle and a controller that searches for the route from the current position to the destination. The controller determines for each sensor whether or not there is an area that is good or bad at monitoring the external situation based on recognition accuracy of the sensor. When determination is made that there is the area that is bad at monitoring the external situation, the controller searches for a route that avoids the monitoring of that area. When determination is made that there is the area that is good at monitoring the external situation, the controller searches for a route that actively uses the monitoring of that area.

The above publication cites a case where the sun is located ahead of an advancing direction of the vehicle as an example of a case where there is the area that is bad at monitoring the external situation. In this example, since sunlight shines into a camera that monitors the front of the vehicle, the monitoring of a situation in the front of the vehicle by the camera becomes difficult. In this example, a route including a detour operation, such as a left turn or a right turn, is searched as a route in which the sun is not located in the front of the vehicle.

SUMMARY

Consideration is made for a ride-sharing service that picks up and transports a plurality of users in the middle of the route from the current position to the destination. In this ride-sharing service, consideration is made that the route may be changed as long as arrival at the destination does not significantly exceed a scheduled point in time. An example of a route after the change includes a route with higher traveling safety than the route before the change. Another example of the route after the change includes a route with a higher pickup probability than the route before the change. Hereinafter, a vehicle that provides the ride-sharing service is also referred to as a "ride-sharing vehicle".

The recognition accuracy of the sensor affects the traveling safety. Therefore, it can be said that there is a correlation between the recognition accuracy and the traveling safety. Consideration is made that the technique of the above publication is applied to the route search of the ride-sharing vehicle. In this case, a route including the above-mentioned detour operation is searched as the route with high traveling safety. However, when the route including the detour operation is employed, there is a high possibility that the route with high pickup probability is not employed. Accordingly, there is room for improvement in order to increase a utilization rate of the ride-sharing service while ensuring the traveling safety of the ride-sharing vehicle.

The present disclosure provides a route search technique capable of increasing a utilization rate of a ride-sharing service while ensuring traveling safety of a ride-sharing vehicle.

A first aspect of the disclosure relates to a route search device for a ride-sharing vehicle, which has the following features. The route search device includes a memory and a processor. The memory is configured to store position data of the ride-sharing vehicle, road data present in a search area including a current position and a destination of the ride-sharing vehicle, distribution data of the number of pedestrians present in the search area, and data of a recognition level of an external situation of the ride-sharing vehicle by an external sensor of the ride-sharing vehicle. The processor is configured to perform search processing for a route from the current position to the destination based on the position data, the road data, the distribution data, and the data of the recognition level. The processor is configured to, in the search processing, calculate a standard route with a shortest requested time from the current position to the destination based on the position data and the road data, calculate a high-frequency route in which a frequency of encountering a pedestrian between the current position and the destination is higher than the standard route based on the position data, the road data, and the distribution data, compare the recognition level with a reference level, and select the standard route as a final route when the recognition level is equal to or less than the reference level and select the high-frequency route as the final route when the recognition level is higher than the reference level.

A second aspect of the disclosure further has the following features in the first aspect. The memory may be configured to further store data of an indoor image of the ride-sharing vehicle. The processor may be further configured to, in the search processing, determine whether or not a predetermined condition regarding safety of a passenger of the ride-sharing vehicle is satisfied based on the data of the indoor image when the recognition level is higher than the reference level, and select the high-frequency route as the final route when the predetermined condition is determined to be satisfied and select the standard route as the final route when the predetermined condition is determined to be not satisfied.

A third aspect of the disclosure further has the following features in the first aspect. The memory may be configured to further store data of a weather condition in the search area. The processor may be further configured to, in the search processing, determine whether or not a predetermined condition regarding safety of a passenger of the ride-sharing vehicle is satisfied based on the data of the weather condition when the recognition level is higher than the reference level, and select the high-frequency route as the final route when the predetermined condition is determined to be satisfied and select the standard route as the final route when the predetermined condition is determined to be not satisfied.

A fourth aspect of the disclosure relates to a route search device for a ride-sharing vehicle, which has the following features. The route search device includes a memory and a processor. The memory is configured to store position data of the ride-sharing vehicle, road data present in a search area including a current position and a destination of the ride-sharing vehicle, distribution data of the number of pedestrians present in the search area, and data of a recognition level of an external situation of the ride-sharing vehicle by an external sensor of the ride-sharing vehicle. The processor is configured to perform search processing for a route from the current position to the destination based on the position data, the road data, the distribution data, and the data of the recognition level. The processor is configured to, in the search processing, calculate a standard route with a shortest requested time from the current position to the destination based on the position data and the road data, calculate a high-frequency route in which a frequency of encountering a pedestrian between the current position and the destination is higher than the standard route and a low-frequency route in which the frequency is lower than the standard route, based on the position data, the road data, and the distribution data, compare the recognition level with upper and lower limit reference levels, and select the high-frequency route as a final route when the recognition level is higher than the upper limit reference level, select the low-frequency route as the final route when the recognition level is lower than the lower limit reference level, and select the standard route as the final route when the recognition level is between the upper and lower limit reference levels.

A fifth aspect of the disclosure further has the following features in the fourth aspect. The memory may be configured to further store data of an indoor image of the ride-sharing vehicle. The processor may be further configured to, in the search processing, determine whether or not a predetermined condition regarding safety of a passenger of the ride-sharing vehicle is satisfied based on the data of the indoor image when the recognition level is higher than the upper limit reference level, and select the high-frequency route as the final route when the predetermined condition is determined to be satisfied and select the standard route as the final route when the predetermined condition is determined to be not satisfied.

A sixth aspect of the disclosure further has the following features in the fourth aspect. The memory may be configured to further store data of a weather condition in the search area. The processor may be further configured to, in the search processing, determine whether or not a predetermined condition regarding safety of a passenger of the ride-sharing vehicle is satisfied based on the data of the weather condition when the recognition level is higher than the upper limit reference level, and select the high-frequency route as the final route when the predetermined condition is determined to be satisfied and select the standard route as the final route when the predetermined condition is determined to be not satisfied.

A seventh aspect of the disclosure relates to a route search method for searching for a route from a current position to a destination of a ride-sharing vehicle by using a data processing device, which has the following features. The data processing device includes a memory and a processor. The memory is configured to store position data of the ride-sharing vehicle, road data present in a search area including a current position and a destination of the ride-sharing vehicle, distribution data of the number of pedestrians present in the search area, and data of a recognition level of an external situation of the ride-sharing vehicle by an external sensor of the ride-sharing vehicle. The processor is configured to perform search processing for a route from the current position to the destination based on the position data, the road data, the distribution data, and the data of the recognition level. The search processing includes calculating a standard route with a shortest requested time from the current position to the destination based on the position data and the road data, calculating a high-frequency route with a frequency of encountering a pedestrian between the current position and the destination that is higher than the standard route based on the position data, the road data, and the distribution data, comparing the recognition level with a reference level, and selecting the standard route as a final route when the recognition level is equal to or less than the reference level and selecting the high-frequency route as the final route when the recognition level is higher than the reference level.

An eighth aspect of the disclosure relates to a route search method for searching for a route from a current position to a destination of a ride-sharing vehicle by using a data processing device, which has the following features. The data processing device includes a memory and a processor. The memory is configured to store position data of the ride-sharing vehicle, road data present in a search area including a current position and a destination of the ride-sharing vehicle, distribution data of the number of pedestrians present in the search area, and data of a recognition level of an external situation of the ride-sharing vehicle by an external sensor of the ride-sharing vehicle. The processor is configured to perform search processing for a route from the current position to the destination based on the position data, the road data, the distribution data, and the data of the recognition level. The search processing includes calculating a standard route with a shortest requested time from the current position to the destination based on the position data and the road data, calculating a high-frequency route in which a frequency of encountering a pedestrian between the current position and the destination is higher than the standard route and a low-frequency route in which the frequency is lower than the standard route, based on the position data, the road data, and the distribution data, comparing the recognition level with upper and lower limit reference levels, and selecting the high-frequency route as a final route when the recognition level is higher than the upper limit reference level, selecting the low-frequency route as the final route when the recognition level is lower than the lower limit reference level, and selecting the standard route as the final route when the recognition level is between the upper and lower limit reference levels.

According to the first or seventh aspect, the standard route and the high-frequency route are calculated in the search processing. When the recognition level is higher than the reference level, the high-frequency route is selected as the final route. When the high-frequency route is selected as the final route, it is possible to perform the transportation while picking up a large number of users in the middle of the high-frequency route. Since the recognition level is higher than the reference level, traveling safety is also ensured. Therefore, it is possible to increase a utilization rate of a ride-sharing service while ensuring the traveling safety.

When the high-frequency route is selected as the final route, a probability of encountering a pedestrian jumping out in front of the ride-sharing vehicle while the ride-sharing vehicle travels on the final route is higher than when the standard route is selected as the final route. When such a pedestrian is encountered, the ride-sharing vehicle may perform an emergency avoidance operation, such as sudden deceleration. A situation where the emergency avoidance operation is performed is not desirable from the viewpoint of the safety of the passenger. In this respect, according to the second or fifth aspect, determination is made whether or not the predetermined condition regarding the safety of the passenger of the ride-sharing vehicle is satisfied based on the data of the indoor image of the ride-sharing vehicle. When the predetermined condition is determined to be not satisfied, the standard route is selected as the final route. Therefore, it is possible to provide the ride-sharing service in consideration of the safety of the passenger of the ride-sharing vehicle VH.

According to the third or sixth aspect, determination is made whether or not the predetermined condition regarding the safety of the passenger of the ride-sharing vehicle is satisfied based on the data of the weather condition in the search area. When the predetermined condition is determined to be not satisfied, the standard route is selected as the final route. Therefore, it is possible to obtain the same effect as the effect of the second or fifth aspect.

According to the fourth or eighth aspect, the standard route, the high-frequency route, and the low-frequency route are calculated in the search processing. When the recognition level is higher than the upper limit reference level, the high-frequency route is selected as the final route. Therefore, it is possible to obtain the same effect as the effect of the first or seventh aspect. In addition, according to the fourth or eighth aspect, when the recognition level is lower than the lower limit reference level, the low-frequency route is selected as the final route. Therefore, it is possible to reach the destination without picking up the user as much as possible in the middle of the low-frequency route, while ensuring the minimum traveling safety.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
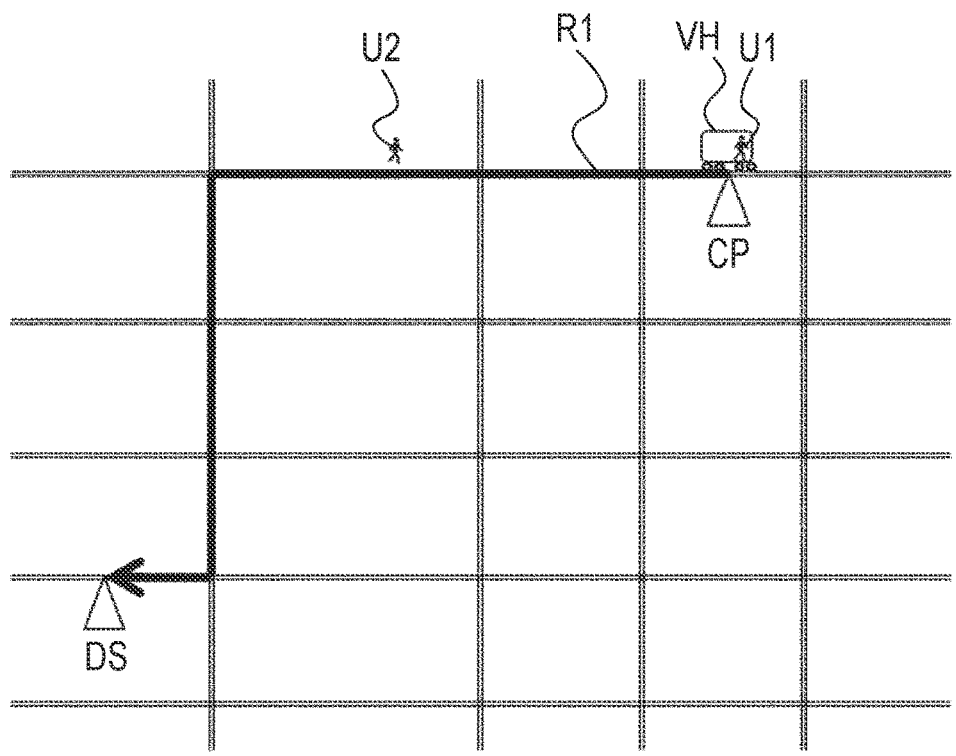
FIG. 1 is a diagram describing a ride-sharing service.

Hereinafter, a route search device according to embodiments of the present disclosure will be described with reference to drawings. A route search method according to the embodiments is realized by computer processing performed by the route search device according to the embodiments. In each figure, the same reference numeral is assigned to the same or corresponding part to simplify or omit the description.

First Embodiment

First, a first embodiment of the present disclosure will be described with reference to FIGS. 1 to 12.

1. Outline of First Embodiment 1-1. Ride-Sharing Service

Figure 2:
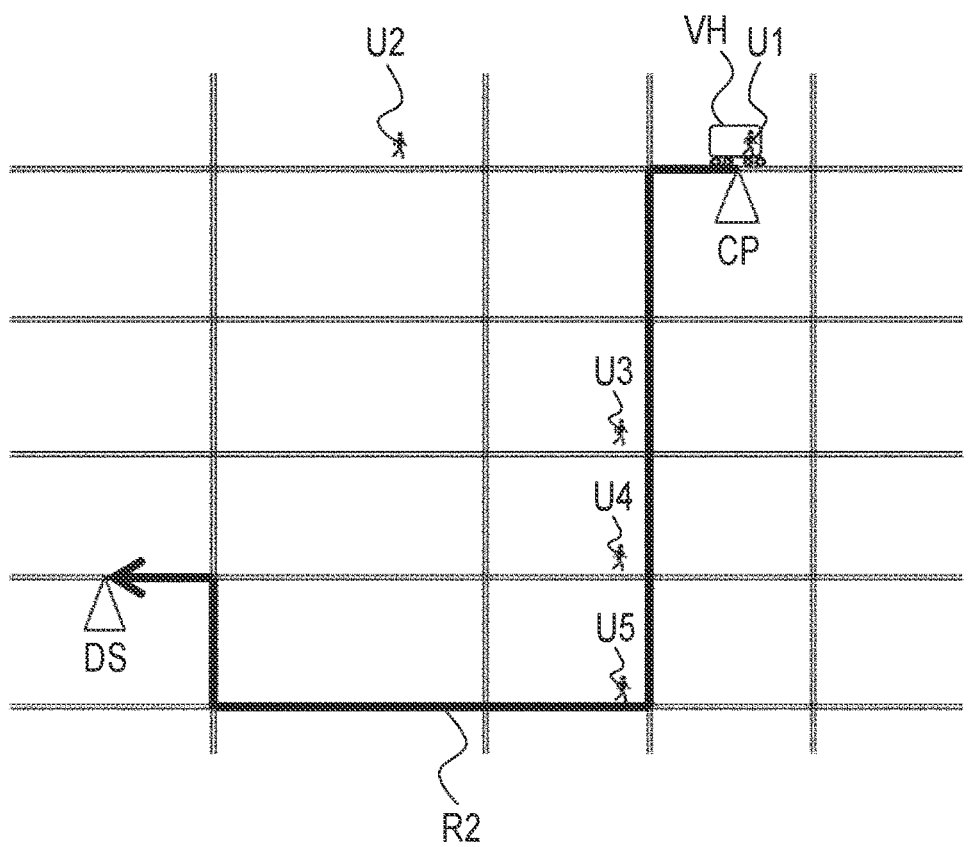
FIG. 2 is a diagram describing the ride-sharing service.

The route search device according to the first embodiment is a device configured to search for a route of a ride-sharing vehicle. The ride-sharing service is a service that picks up and transports a plurality of users in the middle of a route from a current position of the ride-sharing vehicle to a destination. FIGS. 1 and 2 are diagrams describing the ride-sharing service. A ride-sharing vehicle VH is depicted in FIGS. 1 and 2. The ride-sharing vehicle VH is, for example, an autonomous driving vehicle capable of performing driverless driving. The ride-sharing vehicle VH may be a manual driving vehicle.

In the example shown in FIG. 1, the ride-sharing vehicle VH travels on a route R1 from a current position CP to a destination DS. In the example shown in FIG. 2, the ride-sharing vehicle VH travels on a route R2. The current position CP and destination DS are, for example, stops for the ride-sharing vehicle VH. Positions of these stops are set in advance. A user U1 of the ride-sharing service gets on the ride-sharing vehicle VH. For example, the user U1 gets on the ride-sharing vehicle VH at the current position CP and gets off from the ride-sharing vehicle VH at the destination DS.

In the ride-sharing service, it is possible to get on and off the ride-sharing vehicle VH at a position other than the stop. In this case, the current position CP is, for example, a position where the user U1 gets on the ride-sharing vehicle VH. The destination DS is, for example, a position where the user U1 desires to get off the ride-sharing vehicle VH. Information about the destination DS is provided to the ride-sharing vehicle VH from a mobile terminal (for example, smartphone) of the user U1 before and after the user U1 gets on the ride-sharing vehicle VH.

In the ride-sharing service, the users can use one ride-sharing vehicle VH. The information about the destination DS is displayed on a vehicle body of the ride-sharing vehicle VH, for example. In another example, this information is provided to mobile terminals of users U2 to U5 together with information about the route on which the ride-sharing vehicle VH travels. A user who desires to use the ride-sharing vehicle VH makes an intentional expression (for example, raising hand) near the ride-sharing vehicle VH.

When this intentional expression is recognized, the ride-sharing vehicle VH decelerates and temporarily stops.

In the example shown in FIG. 1, when the ride-sharing vehicle VH stops, the user U2 gets on the ride-sharing vehicle VH. The user U2 gets off the ride-sharing vehicle VH at the destination DS. In the example shown in FIG. 2, when the ride-sharing vehicle VH stops, the users U3 to U5 respectively get on the ride-sharing vehicle VH. The users U3 to U5 get off the ride-sharing vehicle VH at the destination DS.

As described above, in the ride-sharing service, the users having the common destination DS (that is, users U1 and U2 in example shown in FIG. 1. Users U1, U3 to U5 in the example shown in FIG. 2) simultaneously use one ride-sharing vehicle VH.

In such a ride-sharing service, an efficient operation of the ride-sharing vehicle VH is crucial. For the efficient operation of the ride-sharing vehicle VH, at least two candidate routes (hereinafter, also referred to as "candidate routes") from the current position CP to the destination DS are searched for in the ride-sharing service. The route R1 shown in FIG. 1 and the route R2 shown in FIG. 2 are examples of these candidate routes.

Comparing the route R1 with the route R2, the route R1 is shorter than the route R2. Therefore, when the route R1 is selected as a final route (route on which the ride-sharing vehicle VH actually travels. The same applies hereinafter.), a time requested from the current position CP to the destination DS is short and the users U1 and U2 can be transported to the destination DS in a short time.

Comparing the route R1 with the route R2, the user U2 is encountered while the ride-sharing vehicle VH travels on the route R1, whereas the users U3 to U5 are encountered while the ride-sharing vehicle VH travels on the route R2. Therefore, when the route R2 is selected as the final route, the users U1 and U3 to U5 can be transported to the destination DS. That is, in this case, more users can be transported to the destination DS.

1-2. Selection of Final Route

The selection of the final route is made before a timing when the ride-sharing vehicle VH departs from the current position CP. The problem here is that information about whether the users U2 to U5 desire to use the ride-sharing service cannot be decided by the ride-sharing vehicle VH at a timing when the final route is selected. In the ride-sharing service, the final route is selected from the candidate routes according to methods described below.

1-2-1. First Example of Final Route Selection Method

Figure 3:
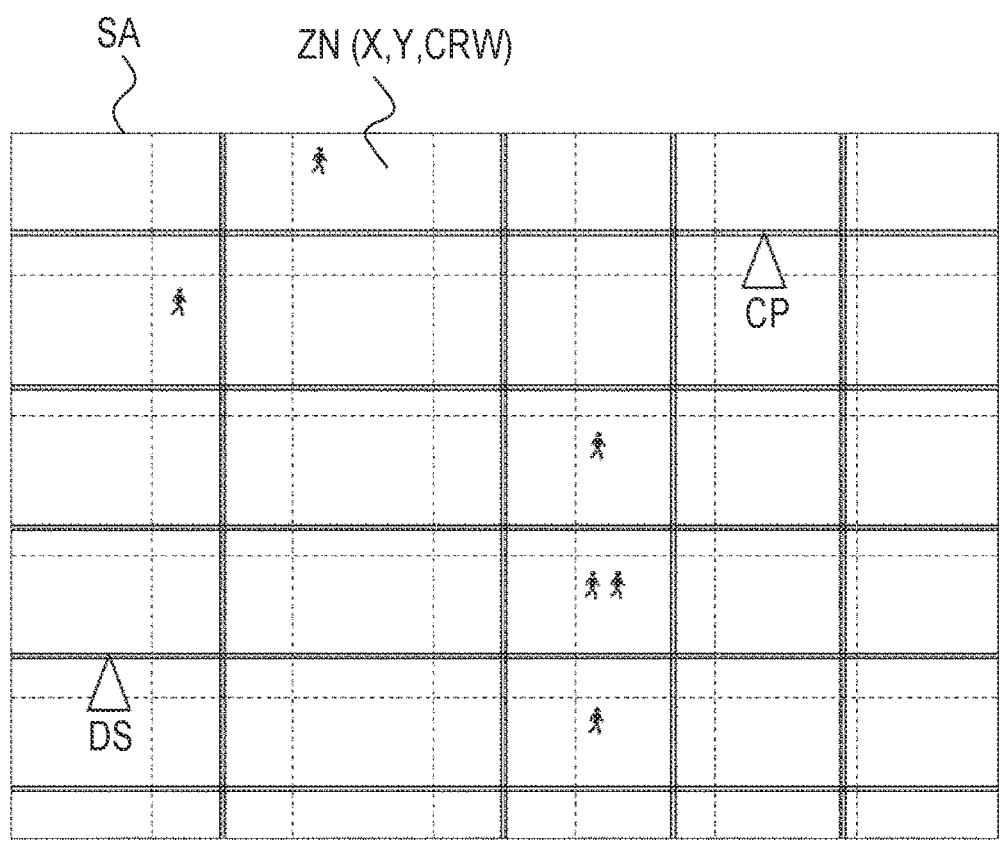
FIG. 3 is a diagram describing a first example of a final route selection method.
Figure 4:
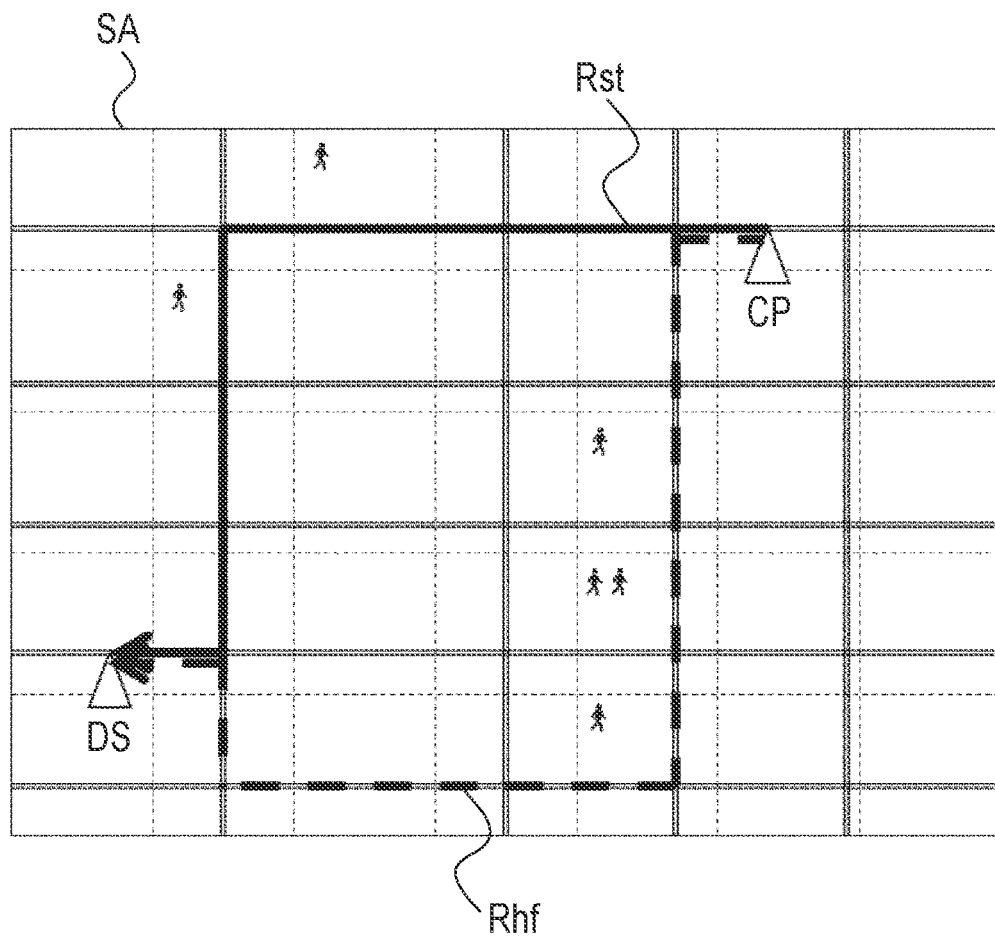
FIG. 4 is a diagram describing the first example of the final route selection method.

FIGS. 3 and 4 are diagrams describing a first example of a final route selection method. In this first example, a search area SA is used. The search area SA is an area to be searched for the route to the current position CP and the destination DS. The search area SA is set based on map data around the current position CP and the destination DS. The search area SA is, for example, a rectangular area including position data of the current position CP and the destination DS (for example, data of latitude X and longitude Y). However, a shape of the search area SA is not limited thereto.

In the first example, data of the number of people CRW in the search area SA is also used. The data of the number of people CRW is set for each combination of a unit zone ZN and a time zone. The unit zone ZN is formed, for example, by dividing an area where the ride-sharing service is planned to be provided in a predetermined area step (for example, 50 to 100 m² step). Individual unit zone ZN is specified by position data (X,Y) of a representative point. The time zone is set, for example, in a predetermined time step (for example, in 10 to 30 minute steps). With the use of the data of the number of people CRW, the number of pedestrians passing through individual unit zone ZN is predicted in a time zone including a set point in time of the search area SA.

The data of the number of people CRW is generated based on, for example, past position data (X,Y) of the pedestrian in the area where the ride-sharing service is provided. The position data (X,Y) of the pedestrian is data indicating that the pedestrian is present at a position specified by longitude X and latitude Y. Accordingly, when the past position data (X,Y) of a plurality of pedestrians is aggregated for each unit zone ZN and time zone, the data of the number of people CRW can be obtained. The data of the number of people CRW may be aggregated in combination with a weekday and a holiday. In this case, with the use of the data of the number of people CRW, it is possible to predict the number of pedestrians passing through individual unit zone ZN according to a set date and the set point in time of the search area SA.

Humanoid icons shown in FIGS. 3 and 4 schematically show the number of people CRW. The large number of humanoid icons drawn in the unit zone ZN means that the number of pedestrians predicted to pass through this unit zone ZN is large. When the data of the number of people CRW for each unit zone ZN is viewed as the entire search area SA, the data of the number of people CRW constitutes distribution data of the number of pedestrians in the search area SA.

In the first example, first, a standard route Rst is calculated. The standard route Rst is a candidate route with the shortest requested time from the current position CP to the destination DS. The requested time is calculated based on, for example, position data (X,Y) of a road present in the search area SA and an average speed of the ride-sharing vehicle VH. In calculating the requested time, the number of traffic lights provided on the candidate route, the number of right and left turns made on the candidate route, a road width (minimum road width, maximum road width) of the road constituting the candidate route, and the like may be taken into consideration. The standard route Rst shown in FIG. 4 is the route R1 shown in FIG. 1.

In the first example, a high-frequency route Rhf is subsequently calculated. The high-frequency route Rhf is a candidate route in which a frequency of encountering the pedestrian between the current position CP and the destination DS (hereinafter, also referred to as "encounter frequency") is higher than the frequency of the standard route Rst. The encounter frequency is calculated based on the distribution data of the number of pedestrians in the search area SA. For example, the number of people CRW in the unit zones ZN through which the candidate route passes is added in the search area SA. Then, a total number of people CRW is calculated for each candidate route. It can be said that the encounter frequency is higher as the total number is higher. The high-frequency route Rhf shown in FIG. 4 is the route R2 shown in FIG. 2.

The high-frequency route Rhf may include two or more candidate routes. However, the high-frequency route Rhf is limited to the candidate route with the requested time that is equal to or less than a permissible time. The permissible time is set with the requested time of the standard route Rst as a reference. The permissible time is, for example, 110 to 130% of the requested time of the standard route Rst. When the scheduled point in time to arrive at the destination DS is set, the permissible time may be set in consideration of this scheduled time further.

In the first example, determination is made based on a recognition level LEV of an external sensor. The external sensor is a sensor that recognizes an external situation of the ride-sharing vehicle VH. Examples of the external sensor include a camera, a millimeter-wave radar, and LiDAR. The recognition level LEV is calculated based on a value obtained by normalizing a specification of the external sensor. Examples of a camera specification include an angle of view and a resolution. Examples of a millimeter-wave radar specification include a distance, a speed, and an angular resolution. Examples of a LiDAR specification include a measurable distance, horizontal and vertical viewing angles, and horizontal and vertical resolutions.

The recognition level LEV is calculated by the following equation (1) expressed based on, for example, a value SCM obtained by normalizing the camera specification, a value SRD obtained by normalizing the millimeter-wave radar specification, and a value SLD obtained by normalizing the LiDAR specification.

$$LEV = \Sigma SCM + \Sigma SRD + \Sigma SLD \quad (1)$$

The values SCM, SRD, and SLD are designed to indicate higher values as performance of the external sensors is higher.

Figure 5:
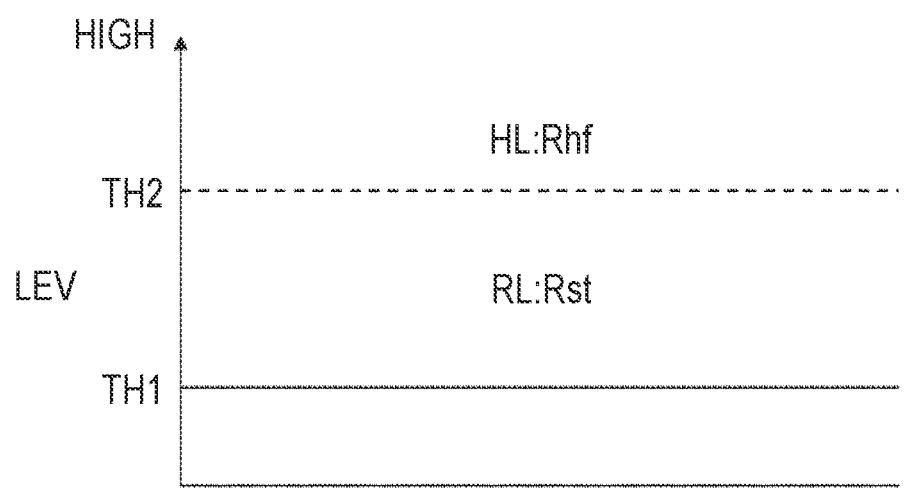
FIG. 5 is a graph showing an example of determination based on a recognition level.

In the determination based on the recognition level LEV, the recognition level LEV calculated based on equation (1) is compared with a reference level. FIG. 5 is a graph showing an example of the determination based on the recognition level LEV. A threshold value TH1 indicates a recognition level that the external sensors are requested to satisfy as a whole in order to recognize the external situation of the ride-sharing vehicle VH. The determination based on the recognition level LEV is performed when the recognition level LEV is higher than the threshold value TH1. The reference level corresponds to a threshold value TH2 (>TH1).

When the recognition level LEV is equal to or less than the threshold value TH2, the recognition level LEV is determined to be a normal level RL. In this case, the standard route Rst is selected as the final route. On the other hand, when the recognition level LEV is higher than the threshold value TH2, the recognition level LEV is determined to be a high level HL. In this case, the high-frequency route Rhf is selected as the final route.

The recognition level LEV affects traveling safety of the ride-sharing vehicle VH. Therefore, it can be said that there is a correlation between the recognition level LEV and the traveling safety. In this respect, the fact that the recognition level LEV is the high level HL means that the ride-sharing vehicle VH has a specification easy to ensure the ensure traveling safety as compared with the case where the recognition level LEV is the normal level RL. Therefore, when the recognition level LEV is determined to be the high level HL, it is possible to perform the transportation while picking up a large number of users in the middle of the high-frequency route Rhf, while ensuring the traveling safety.

1-2-2. Second Example of Final Route Selection Method

Figure 6:
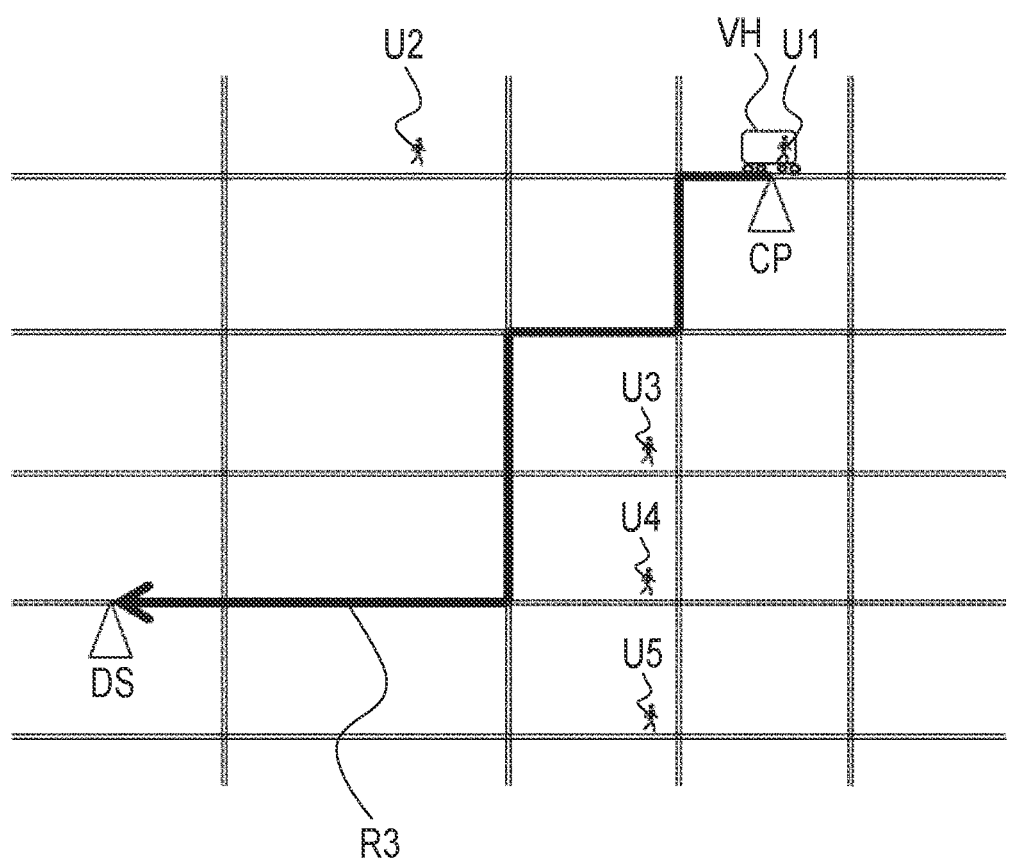
FIG. 6 is a diagram describing a second example of the final route selection method.
Figure 7:
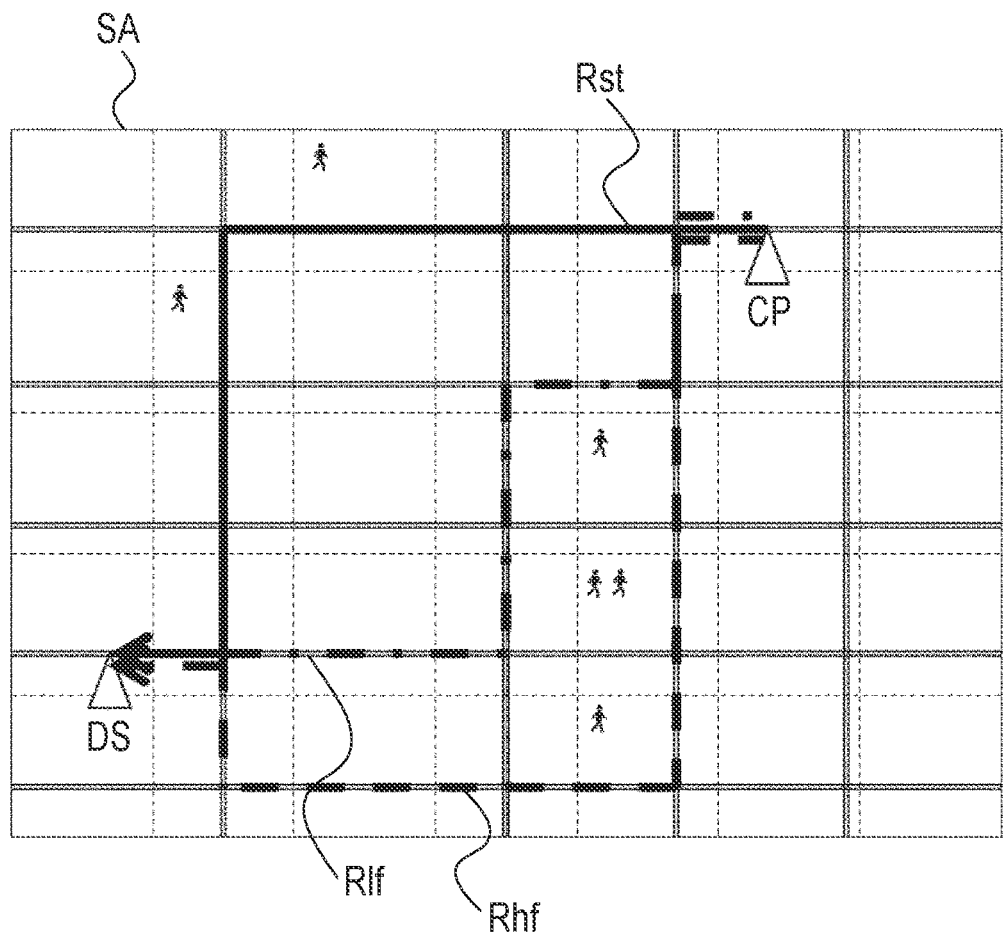
FIG. 7 is a diagram describing the second example of the final route selection method.
Figure 8:
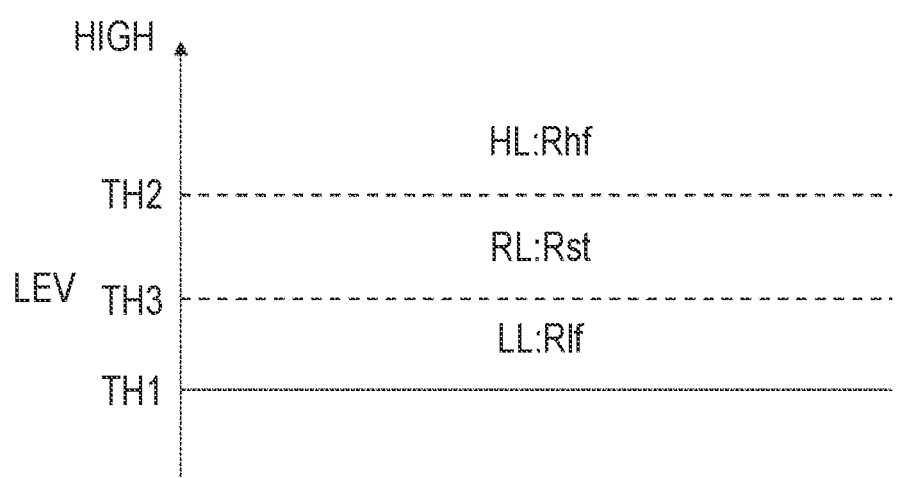
FIG. 8 is a graph showing another example of determination based on the recognition level.

FIGS. 6 to 8 are diagrams describing a second example of the final route selection method. The ride-sharing vehicle VH, the current position CP, the destination DS, and the users U1 to U5 shown in FIG. 6 are as described in FIGS. 1 and 2.

A route R3 shown in FIG. 6 is a candidate route from the current position CP to the destination DS. Comparing the route R3 with the route R1 shown in FIG. 1, the user U2 is encountered while the ride-sharing vehicle VH travels on the route R1, whereas no pedestrian is encountered while the ride-sharing vehicle VH travels on the route R3. Therefore, when the route R3 is selected as the final route, the user U1 can be transported to the destination DS without encountering a pedestrian in the middle of the final route.

As in the first example, the standard route Rst and the high-frequency route Rhf are also calculated in the second example. The standard route Rst shown in FIG. 7 is the same as the route R1 shown in FIG. 1. The high-frequency route Rhf shown in FIG. 7 is the same as the route R2 shown in FIG. 2.

In the second example, a low-frequency route Rlf is calculated after at least the standard route Rst is calculated. The low-frequency route Rlf is a candidate route in which the encounter frequency is lower than the encounter frequency in the standard route Rst. The low-frequency route Rlf may include two or more candidate routes. However, like the high-frequency route Rhf, the low-frequency route Rlf is limited to a candidate route with the requested time that is equal to or less than the permissible time.

As in the first example, the determination based on the recognition level LEV of the external sensor is also performed in the second example. FIG. 8 is a graph showing another example of the determination based on the recognition level LEV. In the example shown in FIG. 8, the recognition level LEV calculated based on equation (1) is compared with two types of reference levels. Specifically, the two types of reference levels are upper and lower limit reference levels. The upper limit reference level corresponds to the threshold value TH2. The lower limit reference level is a threshold value TH3 (TH1<TH3<TH2).

In the example shown in FIG. 8, when the recognition level LEV is higher than the threshold value TH2, the recognition level LEV is determined to be the high level HL. In this case, the high-frequency route Rhf is selected as the final route. Up to this point, the example shown in FIG. 8 is the same as the example shown in FIG. 5.

In the example shown in FIG. 8, when the recognition level LEV is between the threshold values TH2 and TH3, the recognition level LEV is determined to be the normal level RL. In this case, the standard route Rst is selected as the final route. On the other hand, when the recognition level LEV is lower than the threshold value TH3, the recognition level LEV is determined to be a low level LL. In this case, the low-frequency route Rlf is selected as the final route.

As described above, there is a correlation between the level LEV and the traveling safety. In this respect, the fact that the recognition level LEV is a low level LL means that the ride-sharing vehicle VH has a specification difficult to ensure the ensure traveling safety as compared with the case where the recognition level LEV is the normal level RL. Therefore, when the recognition level LEV is determined to be the low level LL, it is possible to reach the destination DS without picking up the user as much as possible in the middle of the low-frequency route Rlf, while ensuring minimum traveling safety.

2. Route Search Device 2-1. Configuration Example of Entire Device

Figure 9:
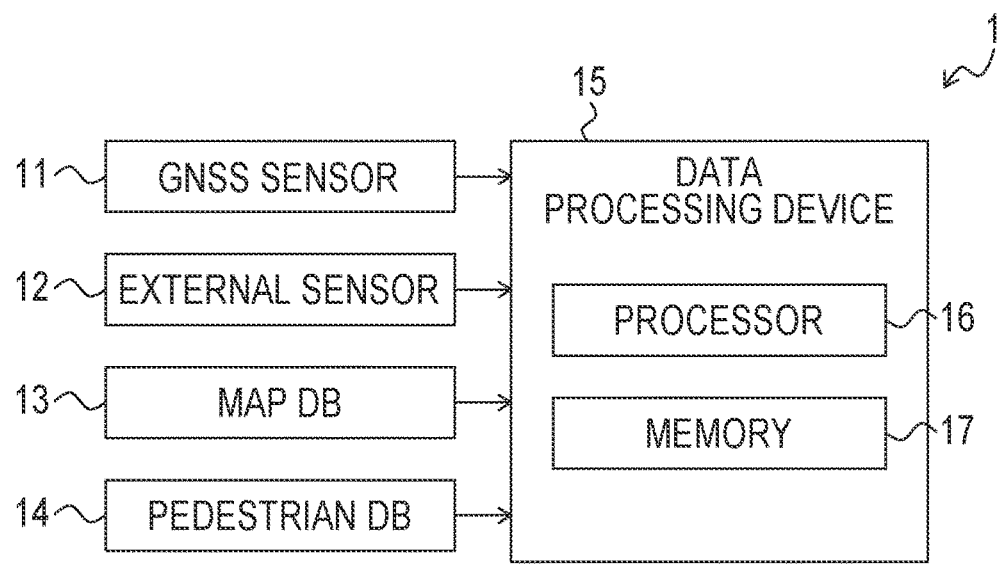
FIG. 9 is a diagram showing a configuration example of a route search device according to a first embodiment.

Hereinafter, a configuration of the route search device according to the first embodiment will be described with reference to FIG. 9. FIG. 9 is a diagram showing a configuration example of the route search device according to the first embodiment. A route search device 1 shown in FIG. 9 is mounted on, for example, the ride-sharing vehicle VH. In another example, the route search device 1 is provided in a remote facility capable of communicating with the ride-sharing vehicle VH. In the latter case, a device configured to transmit and receive data to and from the remote facility is added to the route search device 1.

As shown in FIG. 9, the route search device 1 includes a global navigation satellite system (GNSS) sensor 11, an external sensor 12, a map DB (database) 13, a pedestrian DB 14, and a data processing device 15. The external sensor 12 is not a needed configuration of the route search device 1. The map DB 13 and the pedestrian DB 14 may be provided in the remote facility capable of communicating with the ride-sharing vehicle VH. In this case, instead of the map DB 13 and the pedestrian DB 14, the device configured to transmit and receive data to and from the remote facility is added to the route search device 1.

The GNSS sensor 11 is a device configured to receive signals from three or more artificial satellites. The GNSS sensor 11 is also a device configured to acquire position and posture data POS of the ride-sharing vehicle VH. The GNSS sensor 11 calculates the position and posture (direction) of the ride-sharing vehicle VH based on the signals received from the artificial satellites. The GNSS sensor 11 transmits the position and posture data POS to the data processing device 15.

The external sensor 12 is a device configured to detect a situation around the ride-sharing vehicle VH. Examples of the external sensor 12 include a camera, a millimeter-wave radar, and LiDAR. The camera images the external situation of the ride-sharing vehicle VH. The millimeter-wave radar uses a millimeter-wave to detect a target around the ride-sharing vehicle VH. The LiDAR uses light to detect a target around the ride-sharing vehicle VH. The target includes a static target and a dynamic target. Examples of the static target include a guardrail and a building. The dynamic target includes a pedestrian, a bicycle, a motorcycle, and a vehicle other than the ride-sharing vehicles VH.

The map DB 13 is a database that stores map data. Examples of the map data include road position data, road shape data (for example, types of a curve and a straight line), and position data of an intersection and a structure. The road position data and the road shape data are collectively referred to as "road data ROD". The map data also includes traffic regulation data. The map DB 13 is formed in a predetermined storage device (for example, a hard disk, a flash memory) mounted on the ride-sharing vehicle VH. The map DB 13 may be formed in a computer of the remote facility.

The pedestrian DB 14 is a database that stores the data of the number of people CRW. The data of the number of people CRW is set for each combination of the unit zone ZN and the time zone. As described above, the unit zone ZN is formed, for example, by dividing the area where the ride-sharing service is planned to be provided in the predetermined area step. The time zone is set, for example, in the predetermined time step. The data of the number of people CRW may be set in combination with a weekday and a holiday.

The data processing device 15 is composed of a microcomputer having at least one processor 16 and at least one memory 17. The processor 16 includes a central processing unit (CPU). The processor 16 performs search processing for the route from the current position CP to the destination DS. A specific example of the search processing will be described below. The memory 17 is a volatile memory, such as a DDR memory. The memory 17 expands a program used by the processor 16 and temporarily stores various types of data.

2-2. Configuration Example of Various Types of Data

Figure 10:
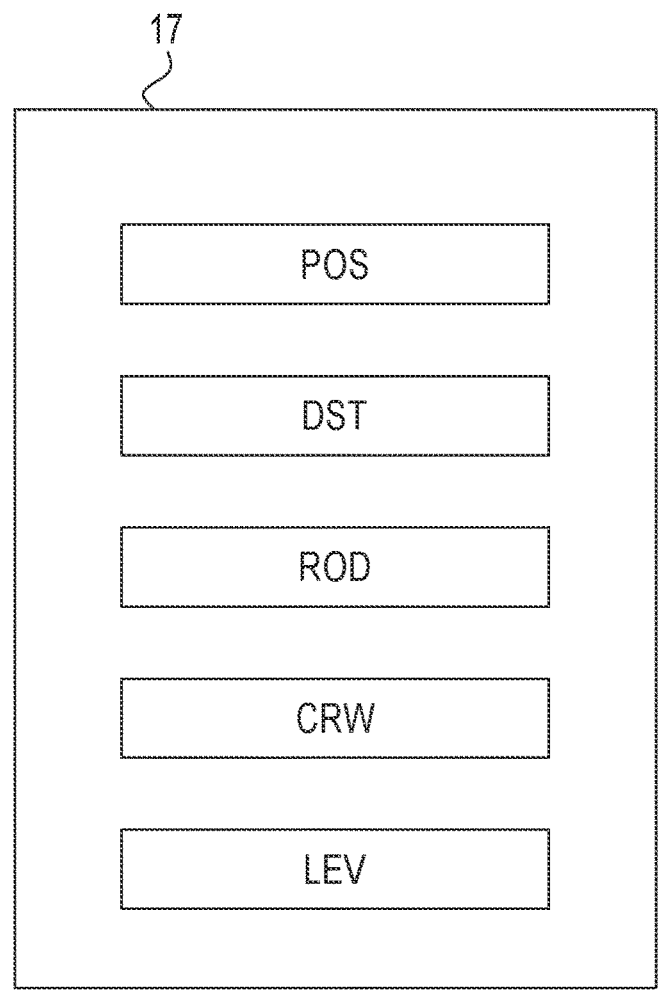
FIG. 10 is a diagram describing an example of various types of data stored in a memory of a data processing device in the first embodiment.

FIG. 10 is a diagram describing an example of various types of data stored in the memory 17. In the example shown in FIG. 10, the position and posture data POS, destination data DST, the road data ROD, the data of the number of people CRW, and data of the recognition level LEV are stored in the memory 17.

The position and posture data POS is data received from the GNSS sensor 11. The destination data DST is data of the destination DS. The road data ROD is data received from the map DB 13. The road data ROD is road data of the search area SA specified based on the position data of the current position CP and the destination DS. The data of the number of people CRW is data of the number of pedestrians in the time zone including the set point in time of the search area SA and is data of the number of pedestrians in individual unit zone ZN included in the search area SA. The data of the recognition level LEV is unique to the ride-sharing vehicle VH. The recognition level LEV is calculated in advance based on a specification of the external sensor 11.

2-3. First Processing Example by Data Processing Device (Processor)

Figure 11:
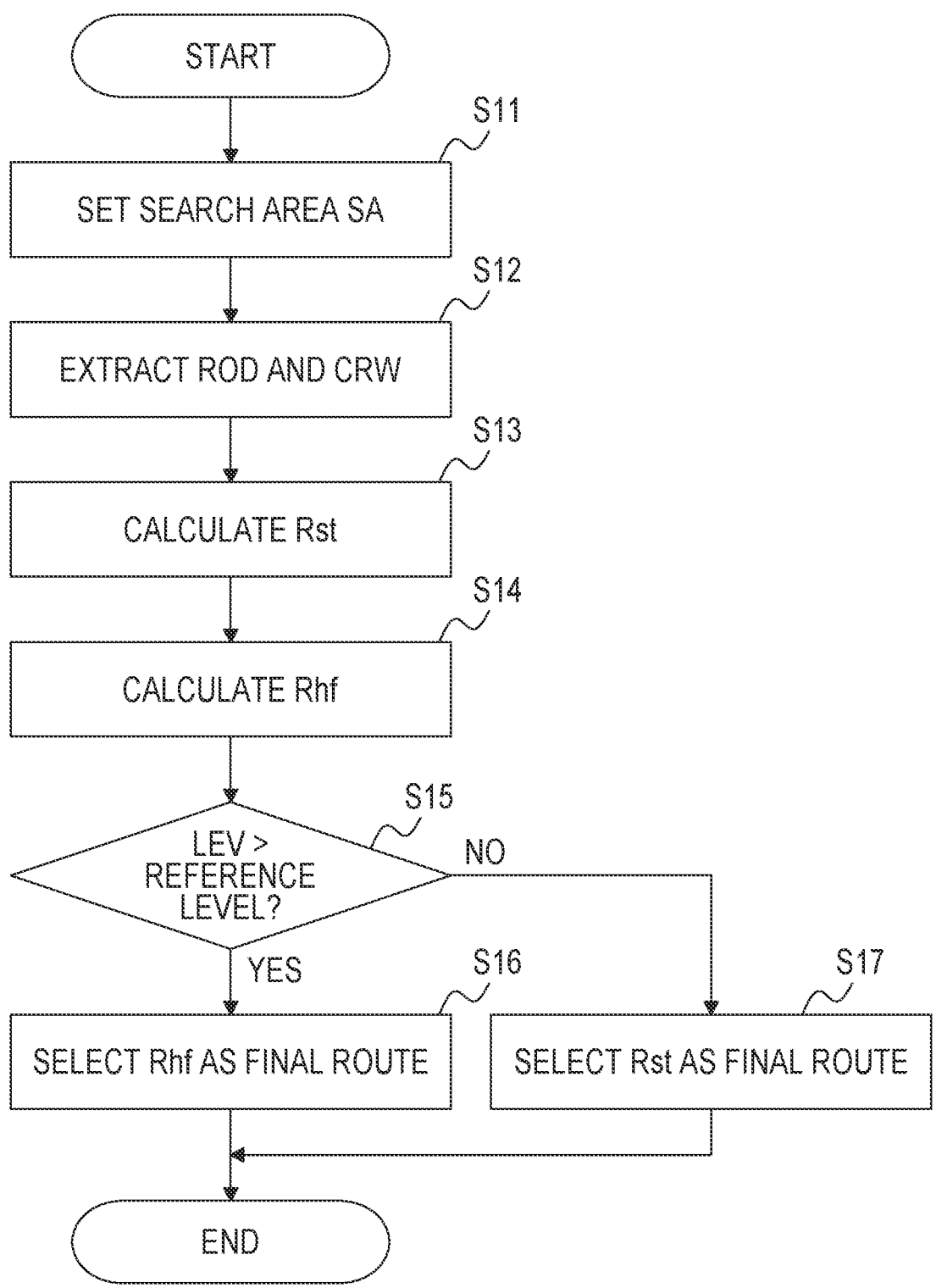
FIG. 11 is a flowchart showing a first example of search processing performed by the data processing device (processor)

FIG. 11 is a flowchart showing a first example of the search processing performed by the data processing device 15 (processor 16). A routine shown in FIG. 11 is executed at a predetermined timing. An example of the predetermined timing includes a timing at which the ride-sharing vehicle VH departs from a departure position (for example, a garage or a bus stop). An example of the predetermined timing also includes a timing after the user gets on the ride-sharing vehicle VH.

In the routine shown in FIG. 11, the search area SA is first set (step S11). The search area SA is set as follows, for example. First, the position and posture data POS is read out from the memory 17 to specify the position data of the current position CP. The position data of the destination DS of the ride-sharing vehicle VH is also acquired. Subsequently, a certain area including the above position data is extracted by referring to the map DB using the position data of the current position CP and the destination DS. Accordingly, the search area SA is set.

Following the processing in step S11, the road data ROD and the data of the number of people CRW are extracted (step S12). The road data is extracted based on the position data of the search area SA set in step S11. The extracted road data is the road data present in the search area SA. The data of the number of people CRW is extracted based on the position data of the search area SA set in step S11 and data of the set point in time of the search area SA. The extracted data of the number of people CRW is data of individual unit zone ZN included in the search area SA in the time zone including the set point in time.

Following the processing in step S12, the standard route Rst is calculated (step S13). As described above, the standard route Rst is the candidate route with the shortest requested time from the current position CP to the destination DS. In the processing in step S13, the requested time is calculated based on the position data of the road extracted in step S12 and the average speed of the ride-sharing vehicle VH. The average speed is calculated based on, for example, a history of a traveling speed of the ride-sharing vehicle VH.

Following the processing in step S13, the high-frequency route Rhf is calculated (step S14). As described above, the high-frequency route Rhf is the candidate route with the encounter frequency that is higher than the standard route Rst. In the processing in step S14, the encounter frequency is calculated by adding the number of people in the unit zone ZN through which the candidate route passes among the number of people CRW extracted in the processing in step S12. After the encounter frequency is calculated, candidate routes with the encounter frequency that is higher than the standard route Rst are extracted.

In the processing in step S14, when the candidate routes with the encounter frequency that is higher than the standard route Rst are extracted, requested times of the candidate routes are calculated. The candidate routes with the requested time that exceeds the permissible time are discarded, and the candidate routes with the requested time that is equal to or less than the permissible time are extracted. Among the extracted candidate routes, the candidate route with a highest encounter frequency is selected as a high-frequency route Thf.

Following the processing in step S14, determination is made whether or not the recognition level LEV exceeds the reference level (step S15). The reference level is the threshold value TH2 described in FIG. 5. In the processing in step S15, the recognition level LEV is read out from the memory 17, and determination is made whether or not the recognition level LEV exceeds the threshold value TH2.

When the determination result in step S15 is affirmative, the high-frequency route Rhf is selected as the final route (step S16). On the other hand, when the determination result in step S15 is negative, the standard route Rst is selected as the final route (step S17).

2-4. Second Processing Example by Data Processing Device (Processor)

Figure 12:
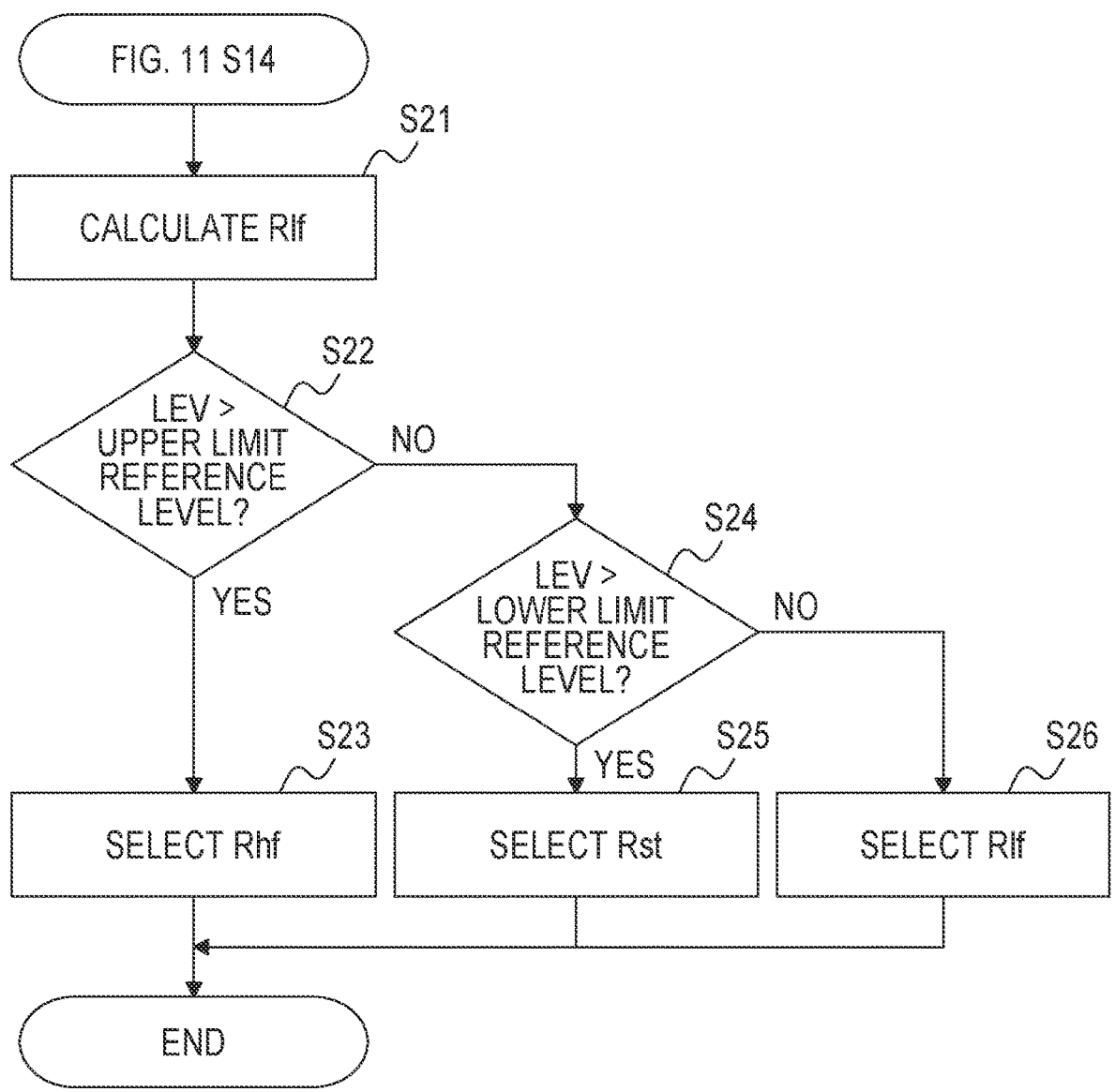
FIG. 12 is a flowchart showing a second example of the search processing performed by the data processing device (processor)

FIG. 12 is a flowchart showing a second example of the search processing performed by the data processing device 15 (processor 16). A routine shown in FIG. 12 is executed following the processing in step S14 shown in FIG. 11.

In the routine shown in FIG. 12, the low-frequency route Rlf is calculated (step S21). As described above, the low-frequency route Rlf is the candidate route in which the encounter frequency is lower than the standard route Rst. In the processing in step S21, the low-frequency route Rlf is selected by the same method as the method described in step S14.

Specifically, first, the encounter frequency is calculated based on the number of people CRW extracted in the processing in step S12. After the encounter frequency is calculated, the candidate routes in which the encounter frequency is lower than the standard route Rst are extracted. When the candidate routes are extracted, the requested time for the candidate route is calculated. The candidate routes with the requested time that exceeds the permissible time are discarded, and the candidate routes with the requested time that is equal to or less than the permissible time are extracted. Among the extracted candidate routes, the candidate route with a lowest encounter frequency is selected as a low-frequency route Tlf.

Following the processing in step S21, determination is made whether or not the recognition level LEV exceeds the upper limit reference level (step S22). The upper limit reference level is the threshold value TH2 described in FIG. 8. In the processing in step S22, the recognition level LEV is read out from the memory 17, and determination is made whether or not the recognition level LEV exceeds the threshold value TH2.

When the determination result in step S22 is affirmative, the high-frequency route Rhf is selected as the final route (step S23). On the other hand, when the determination result in step S22 is negative, determination is made whether or not the recognition level LEV exceeds the lower limit reference level (step S24). The lower limit reference level is the threshold value TH3 described in FIG. 8.

When the determination result in step S24 is affirmative, the standard route Rst is selected as the final route (step S25). On the other hand, when the determination result in step S24 is negative, a low-frequency route Rlf is selected as the final route (step S26).

3. Effect

According to the first embodiment, at least the standard route Rst and the high-frequency route Rhf are calculated as the candidate routes. When the recognition level LEV is higher than the reference level or the upper limit reference level, the high-frequency route Rhf is selected as the final route. When the high-frequency route Rhf is selected as the final route, it is possible to perform the transportation while picking up a large number of users in the middle of the high-frequency route Rhf. Since the recognition level LEV is higher than the reference level or the upper limit reference level, the traveling safety is also ensured. From the above, it is possible to increase a utilization rate of the ride-sharing service while ensuring the traveling safety.

When the standard route Rst, the high-frequency route Rhf, and the low-frequency route Rlf are calculated as the candidate routes, the following effects are expected. That is, in this case, when the recognition level LEV is lower than the lower limit reference level, the low-frequency route Rlf is selected as the final route. Therefore, it is possible to reach the destination DS without picking up the user as much as possible in the middle of the low-frequency route Rlf, while ensuring the minimum traveling safety.

Second Embodiment

Next, a second embodiment of the present disclosure will be described with reference to FIGS. 13 to 15. Description that overlaps with the description of the first embodiment will be omitted as appropriate.

1. Route Search Device 1-1. Configuration Example of Entire Device

In a configuration example of the route search device according to the second embodiment, an indoor camera that images an indoor situation of the ride-sharing vehicle VH is added to the configuration example described with reference to FIG. 9.

1-2. Configuration Example of Various Types of Data

Figure 13:
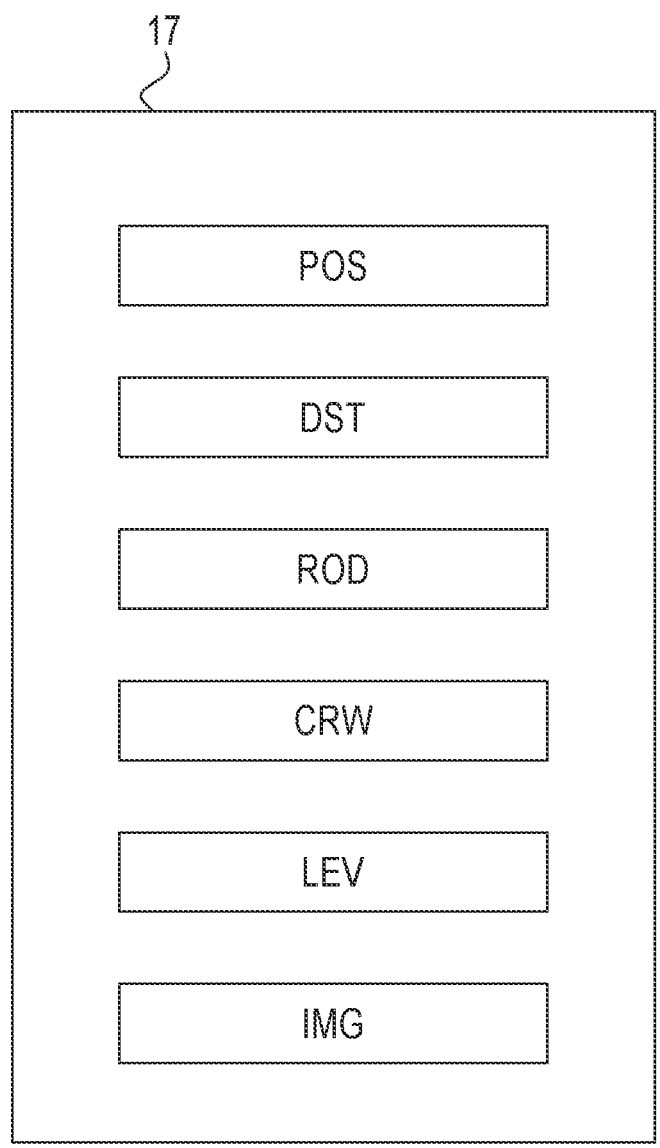
FIG. 13 is a diagram describing an example of various types of data stored in a memory of a data processing device in a second embodiment.

FIG. 13 is a diagram describing an example of various types of data stored in the memory 17. In the example shown in FIG. 13, the position and posture data POS, the destination data DST, the road data ROD, the data of the number of people CRW, the data of the recognition level LEV, and image data IMG are stored in the memory 17. The data other than the image data IMG is as described with reference to FIG. 10. The image data IMG is indoor video data of the ride-sharing vehicle VH. The image data IMG may be a still image.

1-3. Third Processing Example by Data Processing Device (Processor)

Figure 14:
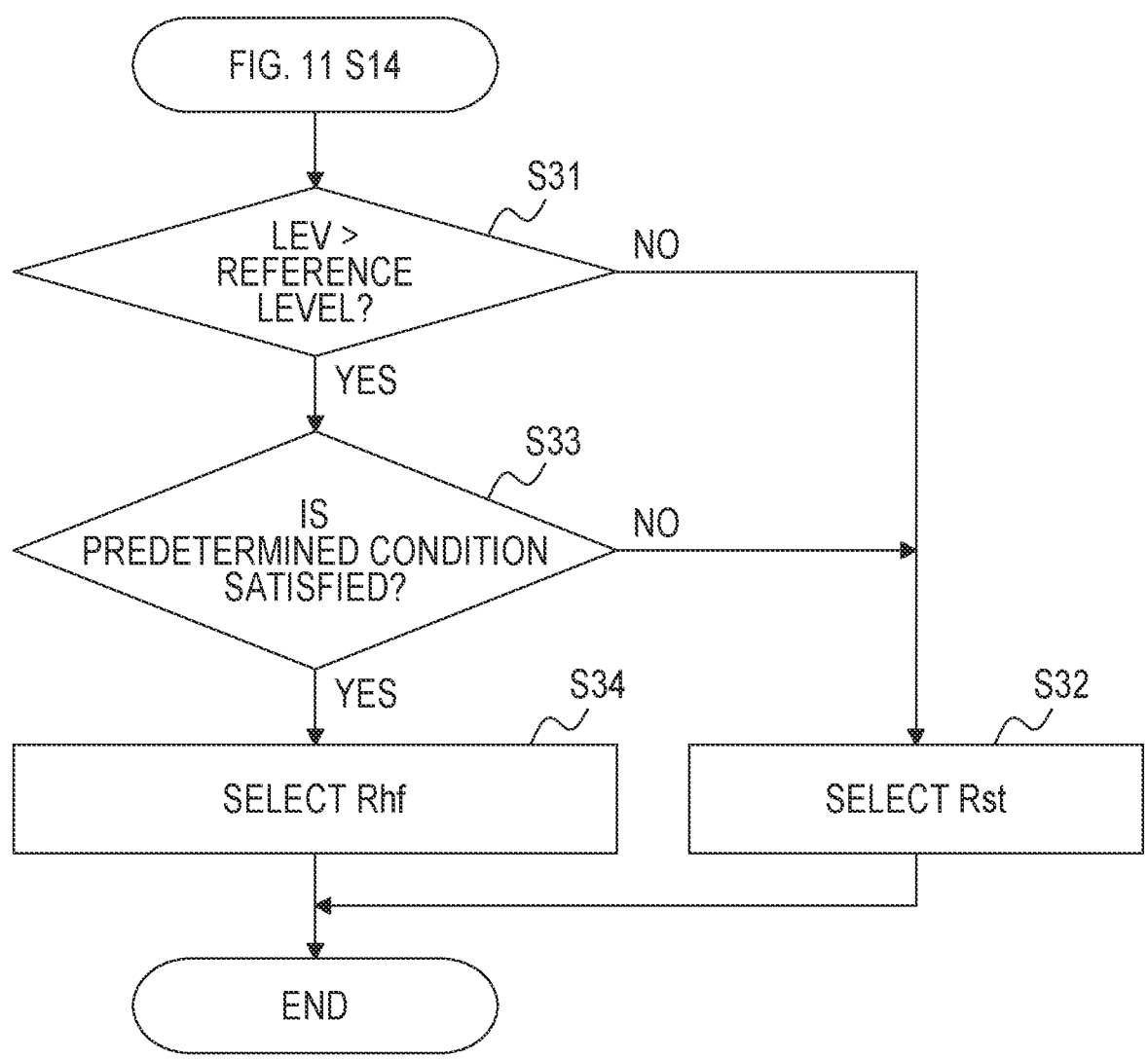
FIG. 14 is a flowchart showing a third example of the search processing performed by the data processing device (processor)

FIG. 14 is a flowchart showing a third example of the search processing performed by the data processing device 15 (processor 16). A routine shown in FIG. 14 is executed following the processing in step S14 shown in FIG. 11.

In the routine shown in FIG. 14, first, determination is made whether or not the recognition level LEV exceeds the reference level (step S31). The content of the processing in step S31 is the same as the content of the processing in step S15 shown in FIG. 11. When the determination result in step S31 is negative, the standard route Rst is selected as the final route (step S32). Up to this point, the third example is the same as the first example described with reference to FIG. 11.

In the third example, when the determination result in step S31 is affirmative, determination is made whether or not a predetermined condition is satisfied (step S33). The predetermined condition includes the following conditions regarding the safety of passengers of the ride-sharing vehicle VH.

First passenger condition: There are no passengers standing in vehicle cabin without sitting in seat Second passenger condition: There are no elderly or children in vehicle cabin The determination whether or not the predetermined conditions are satisfied is made based on the image data IMG read out from the memory 17. A known method is applied to a method of estimating a seated state of the passenger or an age of the passenger based on the image data IMG.

When the first and second passenger conditions are satisfied, determination is made that the predetermined conditions are satisfied. When the determination result in step S33 is affirmative, the high-frequency route Rhf is selected as the final route (step S34). On the other hand, when the determination result in step S33 is negative, the standard route Rst is selected as the final route (step S32).

1-4. Fourth Processing Example by Data Processing Device (Processor)

Figure 15:
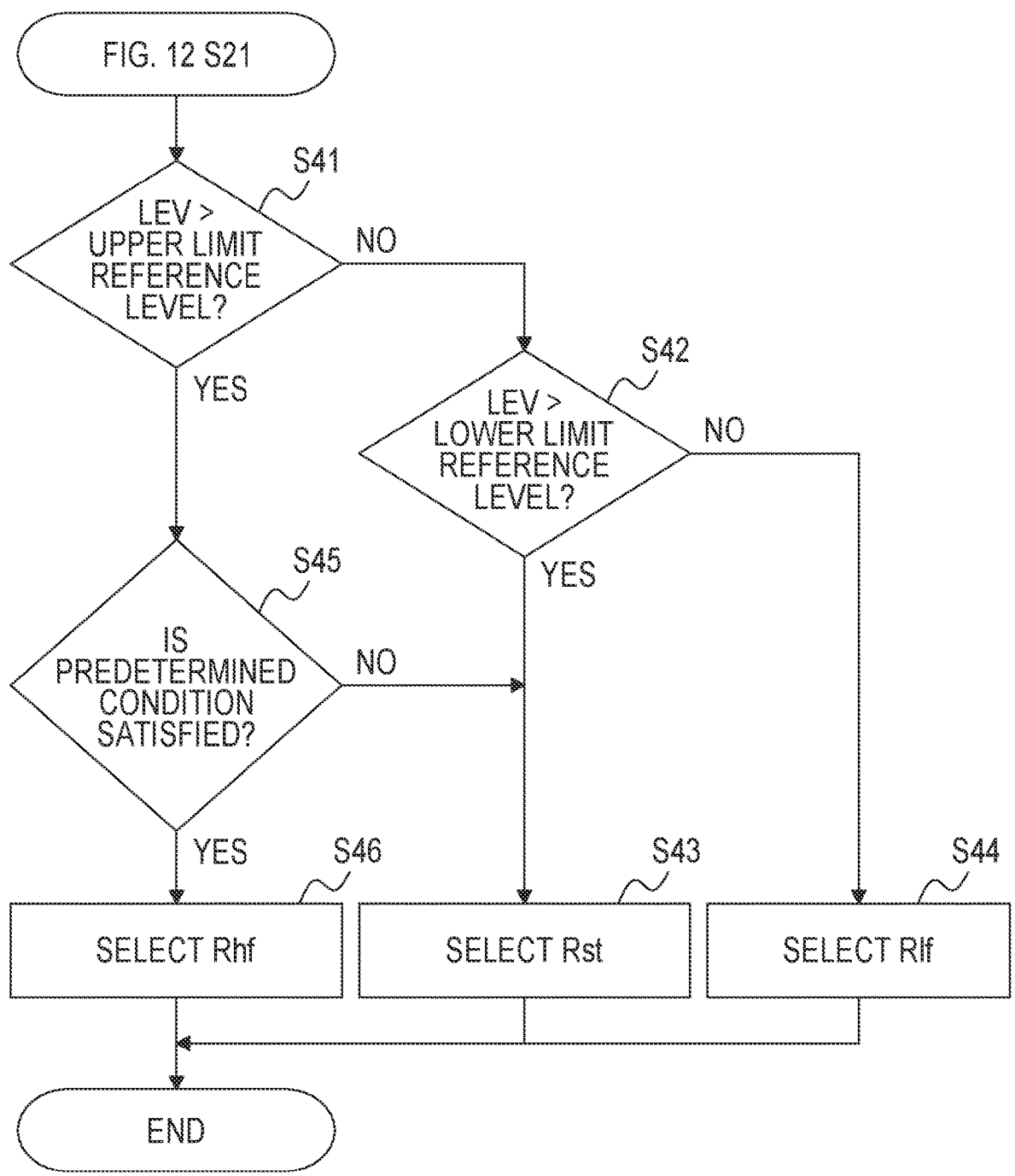
FIG. 15 is a flowchart showing a fourth example of the search processing performed by the data processing device (processor)

FIG. 15 is a flowchart showing a fourth example of the search processing performed by the data processing device 15 (processor 16). A routine shown in FIG. 15 is executed following the processing in step S21 shown in FIG. 12.

In the routine shown in FIG. 15, first, determination is made whether or not the recognition level LEV exceeds the upper limit reference level (step S41). The content of the processing in step S41 is the same as the content of the processing in step S22 shown in FIG. 12. When the determination result in step S41 is negative, determination is made whether or not the recognition level LEV exceeds the lower limit reference level (step S42). When the determination result in step S42 is affirmative, the standard route Rst is selected as the final route (step S43). On the other hand, when the determination result in step S42 is negative, the low-frequency route Rlf is selected as the final route (step S44). Up to this point, the fourth example is the same as the second example described with reference to FIG. 12.

In the fourth example, when the determination result in step S41 is affirmative, determination is made whether or not the predetermined condition is satisfied (step S45). This predetermined condition includes the first and second passenger conditions described above. When the determination result in step S45 is affirmative, the high-frequency route Rhf is selected as the final route (step S46). On the other hand, when the determination result in step S44 is negative, the standard route Rst is selected as the final route (step S43).

2. Effect

According to the second embodiment, when the recognition level LEV is higher than the reference level or the upper limit reference level, determination is made whether or not the predetermined condition is satisfied. When determination is made that the predetermined condition is not satisfied, the standard route Rst is selected as the final route.

As described above, the high-frequency route Rhf is the candidate route with the encounter frequency that is higher than the standard route Rst. Therefore, when the ride-sharing vehicle VH travels on the high-frequency route Rhf, a probability of encountering a pedestrian jumping out in front of the ride-sharing vehicle VH is higher than when the ride-sharing vehicle VH travels on the standard route Rst. When such a pedestrian is encountered, the ride-sharing vehicle VH may perform an emergency avoidance operation, such as sudden deceleration. A situation in which such an emergency avoidance operation is performed is not a desirable situation because the emergency avoidance operation leads to a fall of a standing passenger or a fall from a seat of an elderly person or a child.

In this respect, according to the second embodiment, a disadvantage as the high-frequency route Rhf is selected as the final route can be taken into consideration. Therefore, it is possible to provide the ride-sharing service in consideration of the safety of the passenger of the ride-sharing vehicle VH.

Third Embodiment

Next, a third embodiment of the present disclosure will be described with reference to FIG. 16. Description that overlaps with the description of the first or second embodiment will be omitted as appropriate.

1. Route Search Device 1-1. Configuration Example of Entire Device

In a configuration example of the route search device according to the third embodiment, a communication device configured to perform V2I communication (road-to-vehicle communication) with an infrastructure around the ride-sharing vehicle VH is added to the configuration example described with reference to FIG. 9.

1-2. Configuration Example of Various Types of Data

Figure 16:
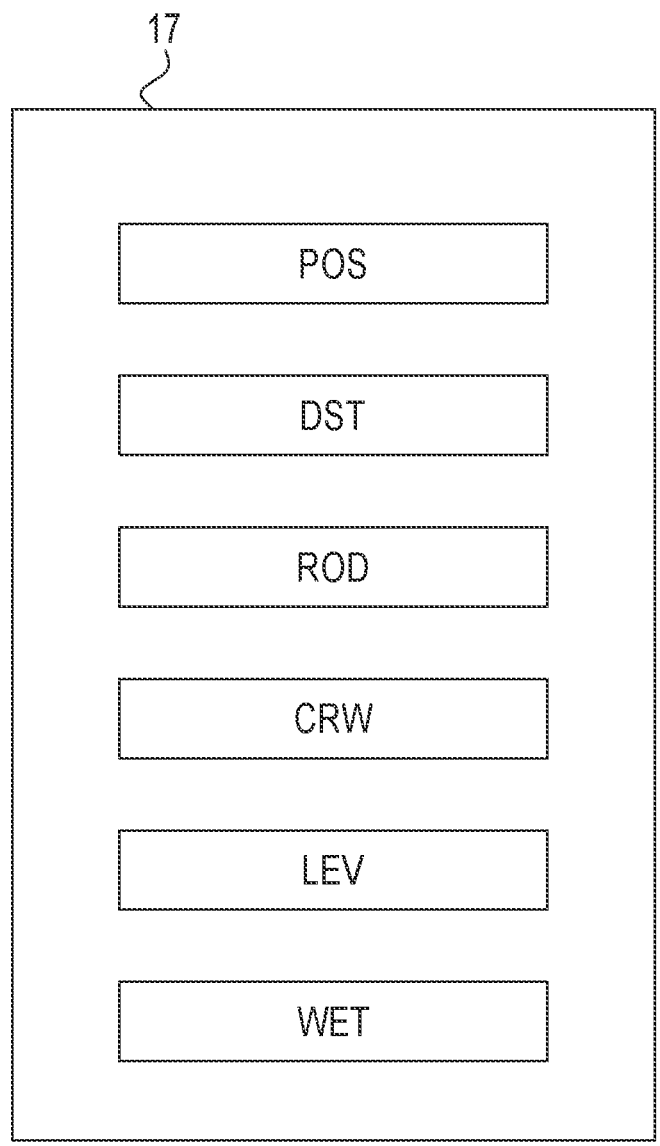
FIG. 16 is a diagram describing an example of various types of data stored in a memory of a data processing device in a third embodiment.

FIG. 16 is a diagram describing an example of various types of data stored in the memory 17. In the example shown in FIG. 16, the position and posture data POS, the destination data DST, the road data ROD, the data of the number of people CRW, the data of the recognition level LEV, and weather data WET are stored in the memory 17. The data other than the weather data WET is as described in FIG. 10. The weather data WET is data of a weather condition (sunny, cloudy, rain, and snow) in the search area SA. The weather data WET is set for each combination of the unit zone ZN and the time zone, as in the data of the number of people CRW.

1-3. Fifth Processing Example by Data Processing Device (Processor)

A fifth example of the search processing performed by the data processing device 15 (processor 16) will be described with reference to FIGS. 14 and 15. The search processing performed in the fifth example is different from the third and fourth examples described with reference to FIGS. 14 and 15 in the content of the predetermined conditions. The predetermined condition of the fifth example includes the following condition regarding the safety of the passengers of the ride-sharing vehicle VH. Weather condition: determination whether or not the predetermined condition that the weather in the unit zone ZN through which the candidate route passes is rain or snow is satisfied is made based on the weather data WET read out from the memory 17.

When the weather condition is satisfied, the predetermined condition is determined to be satisfied. In the fifth example, the determination of the weather condition is made in the processing in step S33 of FIG. 14 or the processing in step S45 of FIG. 15.

2. Effect

According to the third embodiment, when the recognition level LEV is higher than the reference level or the upper limit reference level, determination is made whether or not the predetermined condition is satisfied. The determination of this predetermined condition is also made when the recognition level LEV is lower than the lower limit reference level. When determination is made that the predetermined condition is not satisfied, the standard route Rst is selected as the final route.

As described in the second embodiment, when the ride-sharing vehicle VH travels on the high-frequency route Rhf, the probability of encountering a pedestrian jumping out in front of the ride-sharing vehicle VH is higher than when the ride-sharing vehicle VH travels on the standard route Rst. In addition, under bad weather, such as rain or snow, accuracy of detecting the situation around the ride-sharing vehicle VH by the external sensor 12 is reduced. Therefore, the probability that the emergency avoidance operation is performed increases.

In this respect, according to the third embodiment, a disadvantage as the high-frequency route Rhf is selected as the final route under the bad weather can be taken into consideration. Therefore, it is possible to obtain the same effect as the effect of the second embodiment.

What is claimed is:

1. A route search device for a ride-sharing vehicle, the route search device comprising:
a memory configured to store position data of the ride-sharing vehicle, road data present in a search area including a current position and a destination of the ride-sharing vehicle, distribution data of the number of pedestrians present in the search area, and data of a recognition level of an external situation of the ride-sharing vehicle by an external sensor of the ride-sharing vehicle; and
a processor configured to perform search processing for a route from the current position to the destination based on the position data, the road data, the distribution data, and the data of the recognition level,
wherein the processor is configured to, in the search processing,
calculate a standard route with a shortest requested time from the current position to the destination based on the position data and the road data,
calculate a high-frequency route in which a frequency of encountering a pedestrian between the current position and the destination is higher than the standard route based on the position data, the road data, and the distribution data,
compare the recognition level with a reference level, and
select the standard route as a final route when the recognition level is equal to or less than the reference level and select the high-frequency route as the final route when the recognition level is higher than the reference level.

2. The route search device according to claim 1, wherein:
the memory is configured to further store data of an indoor image of the ride-sharing vehicle; and
the processor is further configured to, in the search processing,
determine whether or not a predetermined condition regarding safety of a passenger of the ride-sharing vehicle is satisfied based on the data of the indoor image when the recognition level is higher than the reference level, and
select the high-frequency route as the final route when the predetermined condition is determined to be satisfied and select the standard route as the final route when the predetermined condition is determined to be not satisfied.

3. The route search device according to claim 1, wherein:
the memory is configured to further store data of a weather condition in the search area; and
the processor is further configured to, in the search processing,
determine whether or not a predetermined condition regarding safety of a passenger of the ride-sharing vehicle is satisfied based on the data of the weather condition when the recognition level is higher than the reference level, and
select the high-frequency route as the final route when the predetermined condition is determined to be satisfied and select the standard route as the final route when the predetermined condition is determined to be not satisfied.

4. A route search device for a ride-sharing vehicle, the route search device comprising:
a memory configured to store position data of the ride-sharing vehicle, road data present in a search area including a current position and a destination of the ride-sharing vehicle, distribution data of the number of pedestrians present in the search area, and data of a recognition level of an external situation of the ride-sharing vehicle by an external sensor of the ride-sharing vehicle; and
a processor configured to perform search processing for a route from the current position to the destination based on the position data, the road data, the distribution data, and the data of the recognition level,
wherein the processor is configured to, in the search processing,
calculate a standard route with a shortest requested time from the current position to the destination based on the position data and the road data,
calculate a high-frequency route in which a frequency of encountering a pedestrian between the current position and the destination is higher than the standard route and a low-frequency route in which the frequency is lower than the standard route, based on the position data, the road data, and the distribution data,
compare the recognition level with upper and lower limit reference levels, and
select the high-frequency route as a final route when the recognition level is higher than the upper limit reference level, select the low-frequency route as the final route when the recognition level is lower than the lower limit reference level, and select the standard route as the final route when the recognition level is between the upper and lower limit reference levels.

5. The route search device according to claim 4, wherein:
the memory is configured to further store data of an indoor image of the ride-sharing vehicle; and
the processor is further configured to, in the search processing, determine whether or not a predetermined condition regarding safety of a passenger of the ride-sharing vehicle is satisfied based on the data of the indoor image when the recognition level is higher than the upper limit reference level, and select the high-frequency route as the final route when the predetermined condition is determined to be satisfied and select the standard route as the final route when the predetermined condition is determined to be not satisfied.

6. The route search device according to claim 4, wherein:
the memory is configured to further store data of a weather condition in the search area; and
the processor is further configured to, in the search processing,
determine whether or not a predetermined condition regarding safety of a passenger of the ride-sharing vehicle is satisfied based on the data of the weather condition when the recognition level is higher than the upper limit reference level, and
select the high-frequency route as the final route when the predetermined condition is determined to be satisfied and select the standard route as the final route when the predetermined condition is determined to be not satisfied.

7. A route search method for searching for a route from a current position to a destination of a ride-sharing vehicle by using a data processing device, the data processing device including a memory configured to store position data of the ride-sharing vehicle, road data present in a search area including a current position and a destination of the ride-sharing vehicle, distribution data of the number of pedestrians present in the search area, and data of a recognition level of an external situation of the ride-sharing vehicle by an external sensor of the ride-sharing vehicle, and a processor configured to perform search processing for a route from the current position to the destination based on the position data, the road data, the distribution data, and the data of the recognition level, wherein the search processing includes
calculating a standard route with a shortest requested time from the current position to the destination based on the position data and the road data,
calculating a high-frequency route with a frequency of encountering a pedestrian between the current position and the destination that is higher than the standard route based on the position data, the road data, and the distribution data,
comparing the recognition level with a reference level, and
selecting the standard route as a final route when the recognition level is equal to or less than the reference level and selecting the high-frequency route as the final route when the recognition level is higher than the reference level.

8. A route search method for searching for a route from a current position to a destination of a ride-sharing vehicle by using a data processing device, the data processing device including a memory configured to store position data of the ride-sharing vehicle, road data present in a search area including a current position and a destination of the ride-sharing vehicle, distribution data of the number of pedestrians present in the search area, and data of a recognition level of an external situation of the ride-sharing vehicle by an external sensor of the ride-sharing vehicle, and a processor configured to perform search processing for a route from the current position to the destination based on the position data, the road data, the distribution data, and the data of the recognition level, wherein the search processing includes
calculating a standard route with a shortest requested time from the current position to the destination based on the position data and the road data,
calculating a high-frequency route in which a frequency of encountering a pedestrian between the current position and the destination is higher than the standard route and a low-frequency route in which the frequency is lower than the standard route, based on the position data, the road data, and the distribution data,
comparing the recognition level with upper and lower limit reference levels, and selecting the high-frequency route as a final route when the recognition level is higher than the upper limit reference level, selecting the low-frequency route as the final route when the recognition level is lower than the lower limit reference level, and selecting the standard route as the final route when the recognition level is between the upper and lower limit reference levels.

\* \* \* \* \*